United States Patent [19]

Samuels et al.

[11] 4,379,875
[45] Apr. 12, 1983

[54] COALESCING AID FOR HIGH NITRILE COPOLYMER LATEX COATINGS

[75] Inventors: Kenneth E. Samuels, Twin Lakes; Wayne T. Wiggins, Aurora, both of Ohio

[73] Assignee: The Standard Oil Company, Cleveland, Ohio

[21] Appl. No.: 221,751

[22] Filed: Dec. 31, 1980

[51] Int. Cl.³ .................................................. C08K 5/34
[52] U.S. Cl. .................................... 524/104; 524/167; 524/173; 524/205; 524/233; 524/280; 524/355
[58] Field of Search ........................... 525/315, 243; 260/29.7 UP; 524/458, 726, 104

[56] References Cited

U.S. PATENT DOCUMENTS 3,256,219  7/1972  Will .................................. 525/315
3,426,102  2/1969  Solak et al. ...................... 260/879

Primary Examiner—Paul R. Michl
Assistant Examiner—N. Sarofim
Attorney, Agent, or Firm—William D. Mooney; Herbert D. Knudsen; Larry W. Evans

[57] ABSTRACT

Nitrile barrier resin latexes containing a coalescing agent which (1) is a solvent for the nitrile barrier resin, (2) has a boiling point between 100° and 300° C., and (3) does not azeotrope with water are excellent oxygen barriers and have good chemical resistance when coated on various substrates. Especially effective coalescing agents are selected from the group consisting of dimethyl formamide, dimethyl acetimide, methyl pyrrolidone, dimethyl sulfoxide, glycol carbonate and tetramethylene sulfone.

11 Claims, No Drawings

COALESCING AID FOR HIGH NITRILE COPOLYMER LATEX COATINGS

BACKGROUND OF THE INVENTION

This invention relates to nitrile barrier resin latex coatings which contain a coalescing agent which (1) is a solvent for nitrile barrier resins, (2) has a boiling point between 100° and 300° C., and (3) does not azeotrope with water. These coatings are an improvement over the coatings described in U.S. Ser. No. 135,383, which is herein incorporated by reference.

Many varieties of coating compositions have been used in the past based on various polymeric materials. These coatings are either solvent borne or water borne. The solvent borne coatings are disadvantageous in that large amounts of volatile organic solvents are present. These solvents are costly and hazardous. The water borne coatings are also disadvantageous in that they are not continuous and have been found to contain more pin holes, voids and the like than the solvent borne coatings.

The aqueous dispersion coatings of this invention avoid the disadvantages of the solvent borne coating composition by the use of water as the predominating component of the solution. Moreover, the problems normally associated with water borne coatings have been solved by the addition of particular coalescing agents which are more fully described below. These coatings also have good chemical resistance and are excellent oxygen barriers.

SUMMARY OF THE INVENTION

This invention relates to a coating composition comprising an aqueous latex of a nitrile barrier resin and a coalescing agent wherein said coalescing agent (1) is a solvent for the nitrile barrier resin, (2) has a boiling point between 100° and 300° C., and (3) does not azeotrope with water. The preferred nitrile barrier resins comprise a copolymer produced by the polymerization of a major proportion of a monounsaturated nitrile and a minor proportion of another monovinyl monomer component copolymerizable therewith in the presence of a preformed rubber polymer. The preferred coalescing agents comprise dimethyl formamide, diethyl formamide, dimethyl acetimide, diethyl acetimide, methyl pyrrolidone, dimethyl sulfoxide, glycol carbonate and tetramethylene sulfone.

DETAILED DESCRIPTION

The nitrile barrier resin latex useful in the inventive coatings can be prepared by any method known in the art. Preferably, these latexes are prepared by the polymerization in emulsion of a major proportion of an olefinically unsaturated nitrile, another monovinyl monomer component copolymerizable therewith and a preformed rubber component. This emulsion polymerization is carried out in an aqueous medium in the presence of an emulsifier and a free radical generating polymerization initiator at a temperature of from about 0° to 100° C. in the substantial absence of molecular oxygen. The preparation of typical latexes are more fully described in U.S. Pat. Nos. 3,426,102, 3,586,737 and 3,763,278, which are herein incorporated by reference. Usually the latex (or blend of latexes) used in this invention will contain from about 10 to 80% solids and will have an average particle size ranging from 500 to 3,000 angstroms.

The olefinically unsaturated nitriles used in the present invention are the alpha, beta-olefinically unsaturated mononitrile having the structure:

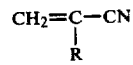

wherein R is hydrogen, a lower alkyl group having from 1 to 4 carbon atoms or a halogen. Such compounds include acrylonitrile, alpha-chloroacrylonitrile, alpha-fluoroacrylonitrile, methacrylonitrile, ethacrylonitrile and the like. The most preferred olefinically unsaturated nitriles useful in the present invention are acrylonitrile and methacrylonitrile and mixtures thereof.

The monovinyl monomer component copolymerizable with the olefinically unsaturated nitrile includes one or more of the esters of olefinically unsaturated carboxylic acids, vinyl esters, vinyl ethers, vinyl ketones, alpha-olefins, vinyl aromatic monomers and others.

The esters of olefinically unsaturated carboxylic acids include those having the structure:

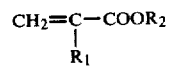

wherein $R_1$ is hydrogen, an alkyl group having from 1 to 30 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, the hexyl acrylates, methyl methacrylate, ethyl methacrylate, the propyl methacrylates, the butyl methacrylates, the amyl methacrylates and the hexyl methacrylates, methyl alpha-chloroacrylates, ethyl alpha-chloroacrylates and the like. Most preferred in the present invention are methyl acrylate, ethyl acrylate, methyl methacrylate and ethyl methacrylate.

The alpha-olefins useful in the present invention are those having at least 4 and as many as 10 carbon atoms having the structure:

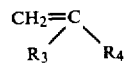

wherein $R_3$ and $R_4$ are alkyl groups having from 1 to 7 carbon atoms, and more specifically isobutylene, 2-methyl butene-1, 2-methyl pentene-1, 2-methyl hexene-1, 2-methyl heptene-1, 2-methyl octene-1, 2-ethyl butene-1, 2-propyl pentene-1 and the like. Most preferred is isobutylene.

The vinyl ethers include methyl vinyl ether, ethyl vinyl ether, propyl vinyl ethers, the butyl vinyl ethers, methyl isopropenyl ether, ethyl isopropenyl ether and the like. Most preferred are methyl vinyl ether, ethyl vinyl ether, the propyl vinyl ethers, and the butyl vinyl ethers.

The vinyl esters include vinyl acetate, vinyl propionate, the vinyl butyrates and the like. Most preferred is vinyl acetate.

The vinyl aromatic monomers include styrene, alpha-methyl styrene, the vinyl toluenes, the vinyl xylenes and the like. Most preferred is styrene.

The olefinic nitrile copolymer is in the presence of a preformed diene rubber which may be a homopolymer or copolymer of a conjugated diene monomer.

The conjugated diene monomers useful in the present invention include butadiene-1,3, isoprene, chloroprene, bromoprene, cyanoprene, 2,3-dimethyl butadiene-1,3,2-ethyl butadiene-1,3, 2,3-diethyl butadiene-1,3 and the like. Most preferred for the purpose of this invention are butadiene-1,3 and the isoprene because of their ready availability and their excellent polymerization properties.

The conjugated diene monomer may be copolymerized with a comonomer selected from the group consisting of vinyl aromatic monomer, an olefinic nitrile monomer having the structure:

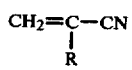

wherein R has the foregoing designation, and an ester having the structure:

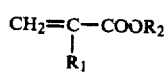

wherein $R_1$ and $R_2$ have the foregoing designations. The rubbery polymer contains from 50% to 100% by weight of polymerized conjugated diene monomer and from 0% to 50% by weight of a comonomer.

Preferred polymers useful in this invention are those prepared by the polymerization of 100 parts by weight of (A) from 60% to 90% by weight of at least one nitrile having the structure:

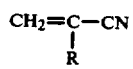

wherein R has the foregoing designation, and (B) from 10% to 40% by weight based on the combined weights of (A) and (B) of at least one member selected from the group consisting of (1) an ester having the structure:

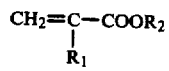

wherein $R_1$ and $R_2$ have the foregoing respective designations, (2) an alpha-olefin having the structure:

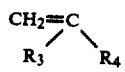

wherein $R_3$ and $R_4$ have the foregoing respective designations, (3) a vinyl ether selected from the group consisting of methyl vinyl ether, ethyl vinyl ether, the propyl vinyl ethers, and the butyl vinyl ethers, (4) vinyl acetate, (5) styrene, and (6) indene, in the presence of from 1 to 40 parts by weight of (C) a rubbery polymer of a conjugated diene monomer selected from the group consisting of butadiene and isoprene and optionally a comonomer selected from the group consisting of styrene, a nitrile monomer having the structure:

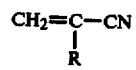

wherein R has the foregoing designation, and an ester having the structure:

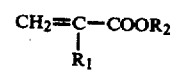

wherein $R_1$ and $R_2$ have the foregoing respective designations, said rubbery polymer containing from 50% to 100% by weight of polymerized conjugated diene and from 0% to 50% by weight of a comonomer.

More preferred polymers useful in this invention are those prepared by the polymerization of more than 70 parts by weight of a monounsaturated nitrile and less than 30 parts by weight of a monovinyl monomer component copolymerizable with said nitrile in the presence of a preformed diene rubber.

Coalescing agents have been discovered which, when combined with the above described latex, result in coatings which are more rust resistant than most known latex coatings. The particular coalescing agents which are effective with the nitrile barrier resin latexes of this invention have very specific properties. In this regard, these coalescing aids (1) must be a solvent for nitrile barrier resins, (2) must have a boiling point between 50° and 400° C., more preferably between 100° and 300° C., and (3) must not azeotrope with water. Moreover, it has been discovered that within this class of coalescing aids certain materials are preferred. The preferred coalescing aids include dimethyl formamide, dimethyl acetimide, methyl pyrrolidone, dimethyl sulfoxide, glycol carbonate and tetramethylene sulfone. These coalescing agents are present in the latex in amounts between 0.1 to 80% by weight based on the total weight of the resin solids. More preferably, about 10 to 40% by weight of a coalescing agent is added to the latex. The coalescing agent is preferably added to the coating within 15 days, more preferably 2 days, of applying the coating to the substrate. If the coalescing agent is added too soon before application, the latex will coagulate. It is also preferred to allow the coalescing agent to mix with the latex at least ½ hour, more preferably 24 hours, before applying the coating to a substrate.

It will be readily apparent to those skilled in the art that the coating compositions of this invention may be further modified by the addition of plasticizers, stabilizers, pigments, dispersants, defoamers, surfactants, extenders and other film formers.

These latex coatings are useful for a wide variety of coating applications. For example, substrates comprising metal, wood and paper can be coated by the instant coating. However, when coating a metal surface, it is preferred that the metal be first treated with an etching material to thoroughly clean said surface. The coating compositions can be applied to the substrate by means of a doctor knife or water bar, airless spray, a roller coater, a conventional or electrostatic air spray gun, by dipping the substrate into the coating formulation, by flow coating, electrodeposition or by other means known to those skilled in the art.

After the coating has been applied to the substrate, it is dried at a temperature between room temperature and 500° C. The drying temperature and procedure will vary depending upon the composition of the coating. Coatings which do not contain any pigment are preferably baked at 85° to 180° C., more preferably at 90° to 160° C., for from 1 second to 60 minutes, more preferably 4 to 8 minutes, and then baked at 140° to 500° C., more preferably for 160° to 240° C., for from 1 second to 60 minutes, more preferably 4 to 8 minutes. The first bake evaporates most of the water and aids in good film formation while the second bake completes the fusion of the film particles and removes substantially all of the volatiles. Coatings which contain pigment are preferably baked at 25° to 500° C., more preferably 180° to 240° C., for from 1 second to 60 minutes, more preferably for 4 to 8 minutes. The drying temperature is closely related to the drying time and it is important not to dry these coatings too long at an elevated temperature or substantial degradation will occur.

SPECIFIC EMBODIMENTS

The invention will be further illustrated by the following examples wherein the amounts of ingredients are given in parts by weight unless otherwise indicated.

EXAMPLE A

A nitrile barrier resin latex was prepared by polymerizing 75 parts of acrylonitrile and 25 parts of methyl acrylate with an acrylonitrile-butadiene rubber as described in Examples 1A and 1A of U.S. Pat. No. 3,426,102. This latex (99.4 parts) was vigorously agitated. A thickener (0.6 parts of a polyvinyl pyrrolidone compound—Rohm & Haas E-845) was slowly added over 5 minutes to the latex. The latex was then sprayed on a Bonderite 40 (trademark of Oxy Metal Industries, Inc.—Parker Division) phosphated steel panel. The panel was then baked at 210° C. for 4 minutes. The dry film thickness was about 1 mil. The coated panel was then tested in a 1,000 hour salt spray test (ASTM B 117-73). It was determined that this panel had a rust rating (ASTM 610-68) of 4.

EXAMPLE 1

The thickened latex (100 parts) compared in Comparative Example A was vigorously agitated. Dimethyl formamide (10 parts), a coalescing agent, was added at a rate of 5 to 10 ml. per minute per liter of coating to the thickened latex. This coating containing the latex, thickener and coalescing agent was stirred for ½ hour after the last of the coalescing agent was added. The coating was left to sit for 24 hours before spraying it on a Bonderite 40 phosphated steel test panel. The coated panel was then baked at 215° C. for 4 minutes. The dry film thickness was 0.4 mils. The coated panel was tested in the salt spray bath described in Comparative Example A and had a rust rating of 5 to 6.

EXAMPLE 2

The experimental procedure of Example 1 was followed except that 20 parts of a dimethyl formamide were added to the thickened latex and the panel was baked at 230° C. rather than 215° C. The rust rating of the coated panel was 5 to 6.

EXAMPLE 3

The experimental procedure of Example 1 was reproduced except that 30 parts of the dimethyl formamide were added to the thickened latex. The rust rating of the coated panel was 6.

COMPARATIVE EXAMPLE B

A thickened latex paint was prepared by the procedure of Comparative Example 1 except that it contained 68.35 parts by weight of the latex and 1.7 parts by weight of the thickener. A paint was formulated from this thickened latex by adding pigments and pigment dispersants as follows: 13.2 parts of titanium dioxide (DuPont's $T_1$ Pure R-900); 6.35 parts of Molywhite (Sherwin Williams' Molywhite 212); 0.49 parts of an anionic surfactant (Rohm & Haas Tamol 850); 0.15 parts of a non-ionic surfactant (Rohm & Haas' Triton CF-10); and 9.76 parts of deionized water. This paint formulation did not contain any coalescing agents. The paint was then applied to a Bonderite 40 phosphated steel panel which was baked at 200° C. for 3 minutes. The dry film thickness was 0.8 to 1.2 mils. The panel was tested in a salt spray for 240 hours by the procedure set forth in Comparative Example A and had a rust rating of 3 to 4.

EXAMPLE 4

The paint (100 parts) prepared in Comparative Example B was agitated. Dimethyl formamide (20 parts) was added to the paint at a rate of 5 to 10 ml. per minute per liter of paint. The paint was then sprayed on the test panel and baked for 8 minutes at 200° C. The panel was then tested by the salt spray procedure outlined in Comparative Example B and had a rust rating of 8 to 9.

COMPARATIVE EXAMPLE C

A thickened latex, prepared by the procedure of Comparative Example A, comprised 66.6 parts of the latex and 1.53 parts of the thickener. A paint was formulated from this thickened latex by adding pigments and pigment dispersants as follows: 11.77 parts of titanium dioxide (DuPont's $T_1$ Pure R-100); 5.67 parts of Halox (Halox CW-2230); 0.26 parts of an ionic surfactant (Rohm & Haas' Tamol 850); 0.087 parts of a non-ionic surfactant (Rohm & Haas' Triton CF-10); and 13.08 parts of deionized water. The paint used in this example did not contain any coalescing agents. This paint was applied to the test panel which was then baked at 200° C. for 4 minutes. The dry film thickness was 0.9 to 1 mil. The panel was tested for 240 hours by the salt spray procedure outlined in Comparative Example A and the panel was found to have a rust rating of 2 to 3.

EXAMPLE 5

The paint (100 parts) formulated in Comparative Example C was vigorously agitated. Dimethyl formamide (40 parts) was added to this paint at a rate of 5 to 10 ml. per minute per liter of coating. The paint was then sprayed on the steel test panel and the panel was then baked at 240° C. for 4 minutes. The dry film thickness was 0.5 to 0.6 mils. After testing in the salt spray for 240 hours, the panel was found to have a rust rating of 8.

EXAMPLE 6

The paint containing the coalescing agent prepared in Example 4 was again applied to a test panel and baked at 240° C. for 4 minutes. This coated panel was then tested in the salt spray test outlined in Comparative Example C for 1,000 hours. At the conclusion of the test, the coated panel has a rust rating of 7.

Although only a few embodiments of this invention have been specifically described above, it should be appreciated that many additions and modifications can be made without departing from the spirit and scope of the invention. These and all other modifications are intended to be included within the scope of this invention, which is to be limited only by the following claims:

We claim:

1. A coating composition comprising a blend of (1) a latex produced by the polymerization of a major proportion of a monounsaturated nitrile and a minor proportion of at least one monovinyl monomer component copolymerizable therewith optionally in the presence of a preformed diene rubber, and (2) a coalescing agent which is (a) a solvent for (1), (b) has a boiling point between 100° and 300° C., and (c) does not azeotrope with water.

2. The composition of claim 1 wherein the latex comprises (A) from 60% to 90% by weight of at least one nitrile having the structure:

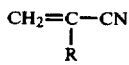

wherein R is hydrogen, a lower alkyl group having from 1 to 4 carbon atoms, or a halogen, and (B) from 10% to 40% by weight based on the combined weights of (A) and (B) of at least one member selected from the group consisting of (1) an ester having the structure:

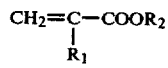

wherein $R_1$ is hydrogen, an alkyl group having from 1 to 30 carbon atoms, or halogen, and $R_2$ is an alkyl group having from 1 to 6 carbon atoms, (2) an alpha-olefin having the structure:

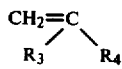

wherein $R_3$ and $R_4$ are alkyl groups having from 1 to 7 carbon atoms, (3) a vinyl ether selected from the group consisting of methyl vinyl ether, ethyl vinyl ether, the propyl vinyl ethers and the butyl vinyl ethers, (4) vinyl acetate, (5) styrene, and (6) indene, in the presence of from 0 to 40 parts by weight of (C) a rubbery polymer of a conjugated diene monomer selected from the group consisting of butadiene and isoprene and a comonomer selected from the group consisting of styrene, a monomer having the structure:

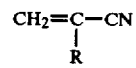

wherein R has the foregoing designation, and an ester having the structure:

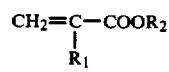

wherein $R_1$ and $R_2$ have the foregoing respective designations, said rubbery polymer containing from 50% to 100% by weight of polymerized conjugated diene and from 0% to 50% by weight of a comonomer.

3. The composition of claim 2 wherein (A) is acrylonitrile.

4. The composition of claim 2 wherein (B) is methyl acrylate.

5. The composition of claim 2 which contains more than 70% of (A) and less than 30% of (B).

6. The coating of claim 1 wherein the coalescing agent is selected from the group consisting of dimethyl formamide, dimethyl acetimide, methyl pyrrolidone, dimethyl sulfoxide, diethyl acetimide, diethyl formamide, acetonitrile, propylene carbonate, ethylene carbonate, benzaldehyde, methoxyethanol, glycol carbonate and tetramethylene sulfone.

7. The coating of claim 6 wherein the coalescing agent is selected from the group consisting of dimethyl formamide and dimethyl sulfoxide.

8. The coating of claim 1 wherein the coating contains less than 50% by weight of the coalescing agent based on the total weight of the resin solids in the latex of the coalescing agent.

9. The coating of claim 8 wherein said coating contains from 10 to 40% of the coalescing agent.

10. A process for preparing a coating comprising blending (1) a latex produced by the polymerization of a major proportion of a monounsaturated nitrile and a minor proportion of at least one monovinyl monomer component copolymerizable therewith in the presence of a preformed diene rubber, and (2) a coalescing agent which is (a) a solvent for (1), (b) has a boiling point between 100° and 300° C., and (c) does not azeotrope with water.

11. The composition of claim 1 wherein the coalescing agent is selected from group consisting of dimethyl acetimide, dimethyl sulfoxide, methyl pyrrolidone, diethyl acetimide, acetonitrile, propylene carbonate, ethylene carbonate, benzaldehyde, methoxyethanol, glycol carbonate and tetramethylene sulfone.

* * * * *